Figure 1:
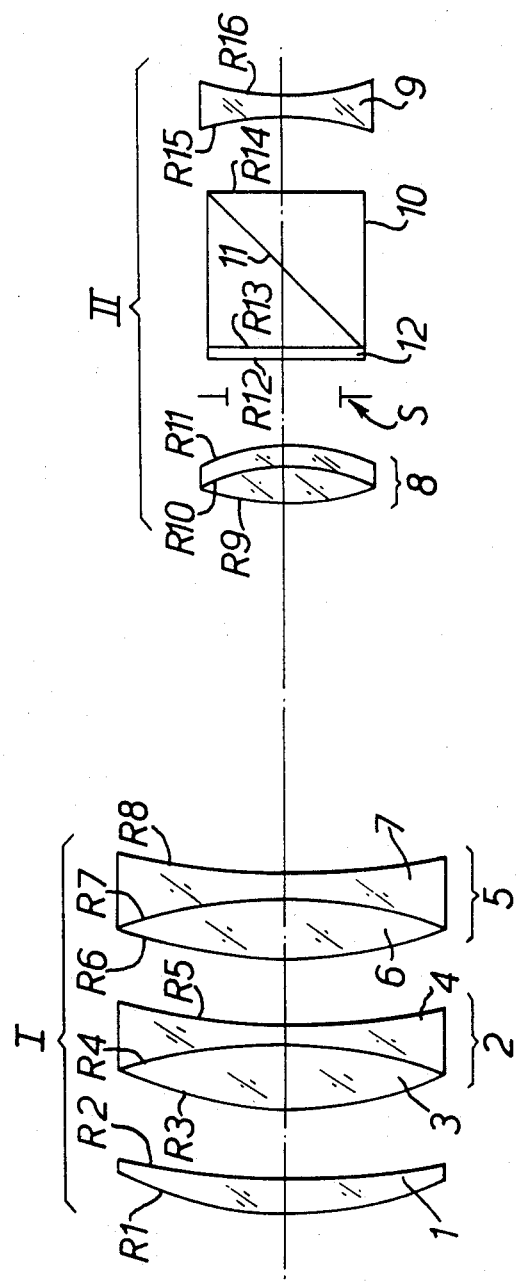

United States Patent [19]
Rogers

[11] 4,329,024
[45] May 11, 1982

[54] OBJECTIVE LENSES
[75] Inventor: Philip J. Rogers, Clwyd, Wales
[73] Assignee: Pilkington P.E. Limited, St. Helens, England
[21] Appl. No.: 944,607
[22] Filed: Sep. 12, 1978
[30] Foreign Application Priority Data
Sep. 13, 1977 [GB] United Kingdom ............... 38194/77
[51] Int. Cl.³ ................................................. G02B 9/60
[52] U.S. Cl. ..................................... 350/465; 350/412; 350/49
[58] Field of Search ............... 350/217, 218, 221, 230, 350/231, 49, 50, 52, 216, 465, 479, 412

[56] References Cited
U.S. PATENT DOCUMENTS

| | | | |
|---|---|---|---|
| 3,236,151 | 2/1966 | Solisch et al. | 350/216 |
| 3,270,616 | 9/1966 | Hopkins | 350/230 |
| 3,333,053 | 7/1967 | Back | 350/231 |
| 3,658,406 | 4/1972 | Karube et al. | 350/52 |

*Primary Examiner*—S. C. Buczinski
*Attorney, Agent, or Firm*—Schuyler, Banner, Birch, McKie & Beckett

[57] ABSTRACT

The invention provides an objective lens with a front lens group and a rear lens group spaced apart from the front group. The front group comprises at least two doublet components one of which is a crown positive element cemented to a flint negative element which has a higher refractive index and dispersion values than those of the crown glass. The other doublet component of the front group is a crown positive element and a flint negative element in which the flint and crown glasses have similar refractive indices but dissimilar dispersions with the flint glass having a positive red relative partial dispersion deviant.

16 Claims, 4 Drawing Figures

OBJECTIVE LENSES

This invention concerns improvements in or relating to objective lenses and relates more particularly to objective lenses suitable for use in a low light level or night vision devices.

Low light level or night vision devices commonly have an objective lens (which focusses incident light on to a photocathode) of the Petzval type. This type of lens has the ability to achieve a high aperture without having severe manufacturing tolerances and additionally provides a long central air gap in which, for example, a mirror (which may be fixed or adjustable in angle) which folds the light path can be situated.

However, Petzval lenses generally suffer from spherochromatism (i.e. chromatic variation of spherical aberration) to a greater extent than, for example, an equivalent Double-Gauss lens. Further, in common with Double-Gauss and other high aperture lens types, the secondary spectrum (i.e. variation of focus position with wavelength) of a Petzval lens generally becomes significant over a wide spectral bandwidth such as, for example, a bandwidth of approximately 420 to 880 nanometers (which is the usable bandwidth of a particular photocathode, known as S25, used in certain image intensifier tubes) when the focal length of the lens is relatively long (e.g. greater than 100 millimeters).

According to the present invention there is provided an objective lens having a front lens group and a rear lens group spaced from the front lens group, wherein the front lens group comprises at least two doublet components one of which consists of a crown positive element cemented to a flint negative element with the flint glass having significantly higher refractive index and dispersion values than those of the crown glass, the other said doublet component consisting of a crown positive element and a flint negative element with the flint and crown glasses having similar refractive indices but dissimilar dispersions, the flint glass having a positive red relative partial dispersion deviant.

Preferably in said one doublet component the flint glass has a refractive index value $n_F$ and a constringence, or V value, $V_F$ and the crown glass has a refractive index value $n_c$ and a constringence, or V value, $V_c$, which accord with the relationships:

$n_F - n_c > +0.09$ $V_c - V_F$ between 20 and 30

Preferably in said other doublet component the flint glass has a refractive index value $n_F$ and a constringence, or V value, $V_F$ and the crown glass has a refractive index value $n_c$ and a constringence, or V value, $V_c$ which accord with the relationships:

$n_c - n_F$ between +0.08 and −0.02

$V_c - V_F > 4.5$

In said other doublet component the crown and flint elements are preferably, but not necessarily, cemented together.

The front lens group may comprise, in addition to said at least two doublet components, one or more singlet elements. For example there may be provided a single singlet element located in front of the front doublet component, or two singlet elements located in front of the front doublet component, or one singlet element located in front of the front doublet component and another singlet element located behind the back doublet component, these being well known methods of increasing the aperture of a Petzval lens.

The rear lens group may be as in a conventional Petzval type of lens, and may for example consist of a positive cemented doublet component and a negative field-flattening element placed close to the image plane. There may be a gap in the rear lens group, for example between said doublet component and the field flattening element, and a beam-combining prism, for example having a dichroic interface, may be located in the gap to permit injection of an additional image.

The space or gap between the front lens group and the rear lens group may be sufficiently long (for example about 0.9 F where F is the focal length of the complete lens) to accommodate means to fold or bend the light path through the lens. Specifically a plane mirror may be located in that gap. Such mirror may be adjustable in angle and in particular the front lens group and the mirror may be mounted for angular movement about an axis in the plane of the mirror and means provided to move the mirror angularly at half the speed of angular movement of the front lens group thereby enabling the line of sight of the lens to be variable whilst maintaining a fixed image position.

A lens in accordance with the invention may be considered as a modified Petzval lens and from this aspect the invention further provides in an objective lens basically of the Petzval type and having a front group of lens elements comprising a doublet component consisting of a crown positive element cemented to a flint negative element, the flint glass having significantly higher refractive index and dispersion values than the crown glass, the lens further having a rear group of lens elements, the improvement comprising an additional doublet component in the front group of lens elements, said additional doublet component being positioned adjacent the first said doublet component and consisting of a crown positive element and a flint negative element, the flint and crown glasses having similar refractive indices but dissimilar dispersions and the flint glass having a positive red relative partial dispersion deviant.

Figure 2:
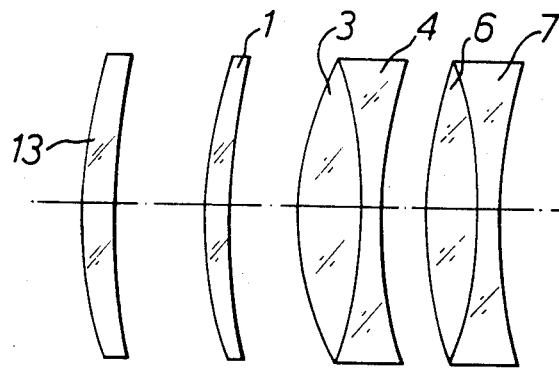
Figure 3:
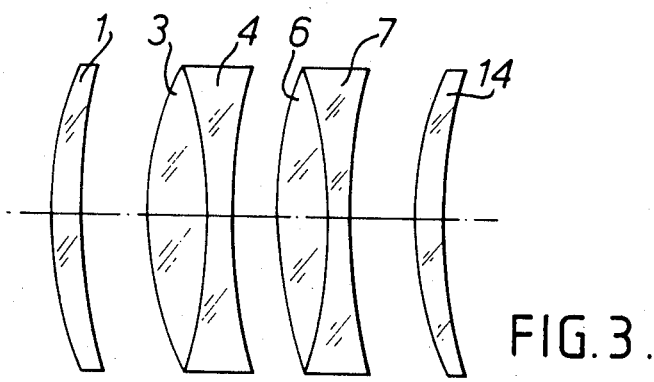
Figure 4:
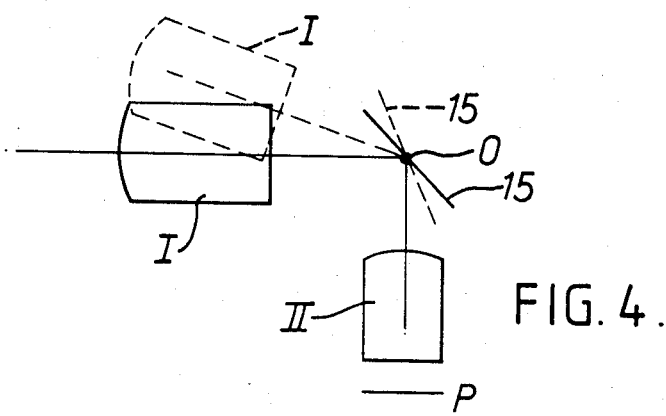

Embodiments of lens in accordance with the invention will now be described by way of example with reference to the accompanying drawings in which:

FIG. 1 is a schematic representation of a first embodiment of objective lens,

FIG. 2 schematically illustrates a modification to part of the embodiment of FIG. 1, FIG. 3 schematically illustrates another modification to part of the embodiment of FIG. 1, and FIG. 4 schematically illustrates features which may advantageously be incorporated in a lens according to the invention.

The objective lens shown in FIG. 1 has a front lens group I and a rear lens group II spaced from the front lens group.

The front lens group I comprises a singlet positive element 1 behind which is a first positive doublet component 2 consisting of a crown positive element 3 cemented to a flint negative element 4. The flint glass of the element 4 has refractive index and dispersion values which are significantly higher than those of the crown glass of the element 3. Specifically:

$n_F - n_c > 0.09$ and $V_c-V_F$ between 20 and 30 (and typically between 24 and 29)

where $n_F$ and $n_c$ are the refractive indices and $V_F$ and $V_c$ are the constringences, or V values, of the flint and crown glasses respectively (it being appreciated that constringence, or V value, bears an inverse relationship to dispersion).

In the front lens group I there is behind the first doublet component 2 a second doublet component 5 consisting of a crown positive element 6 and a flint negative element 7, the elements 6 and 7 preferably, but not necessarily, being cemented together. In this doublet component the flint glass of the element 7 and the crown glass of the element 6 have similar refractive indices but dissimilar dispersions. Specifically:

$n_c - n_F$ between $+0.08$ and $-0.02$ and $V_c - V_F > 4.5$ where $n_F$ and $n_c$ are the refractive indices and $V_F$ and $V_c$ are the constringences, or V values, of the flint and crown glasses respectively.

Further, the flint glass of the element 7 has a positive red relative partial dispersion deviant relative to the "normal" partial dispersion line which preferably has a $\Delta$Pcs value at least $+0.0035$ when the nominal Pcs value is defined by the equation Pcs$=+0.4029+0.002331$ V. It will be understood that Pcs$=(n_c-n_s)/(n_F-n_c)$ ($\lambda F=486.1$ nm; $\lambda c=656.3$ nm; $\lambda s=852.1$ nm).

The rear lens group II takes a form known per se in Petzval type lenses and consists of a positive cemented doublet component 8 and a negative field-flattening element 9 placed close to the image plane P. The stop position S is just behind the doublet 8.

There is a space or air-gap between the doublet 8 and the field-flattening element 9 and a beam-combining prism 10 having a dichroic interface 11 may be located in this air gap to permit injection of an additional image in a manner well known per se. A filter 12, such as a "minus-blue" filter, may be cemented to the front face of the prism 10.

It has been found that an objective lens of the form described above, which may be considered as a modified Petzval lens, can give reduced spherochromatism and substantially reduced secondary spectrum relative to a conventional Petzval lens.

A conventional Petzval lens typically has a single cemented doublet component in its front lens group and almost all of the correction of spherical aberration arises at the cemented contact surface of this doublet. This contact also supplies most of the correction of longitudinal chromatic aberration in the overall lens. The considerable change of refractive index difference across the contact with wavelength necessary to achieve the latter also gives rise to a considerable variation of spherical aberration correction at this surface, i.e. a large amount of spherochromatism. The high refractive index of the flint glass in the doublet ($n_F > 1.7$) rules out the economic use of a glass type with a relative dispersion (i.e. a positive red relative partial dispersion deviant) which could effect a reduction of the inherent secondary spectrum of the overall lens.

By the provision of an additional doublet component in the front lens group, as proposed herein, a reduction of spherochromatism and a large reduction of secondary spectrum can be achieved by, in effect, splitting the function of the conventional single doublet component. Specifically, it permits a reduction of the variation of the refractive index difference across the cemented contact surface of the front doublet component 2 with change of wavelength (relative to that required when the front lens group has a single doublet component). Such lower dispersion difference reduces the spherochromatism introduced at the contact surface but also results in insufficient correction of chromatic aberration. However the correction of the chromatic aberration of the lens group can be completed by the second doublet component 5 having crown and flint glass elements 6 and 7 of similar, relatively low (e.g. $<1.63$), refractive indices but dissimilar dispersions, the flint glass having a higher dispersion than the crown glass. The flint glass of the element 7 further has a positive red relative partial dispersion deviant which gives a substantial reduction of secondary spectrum.

The lens can therefore be designed, for example, to give high performance at focal lengths of the order of 150 to 200 millimeters and apertures of typically F/1.15 over the wide spectral bandwidth of an S25 photocathode.

Particular examples of lens in accordance with the embodiment of FIG. 1 have numerical data as follows, the surfaces from front to back being indicated as R1 to R16. The dimensional units are millimeters, it being appreciated that the values are relative and can be scaled accordingly.

| Element | Surface | Radius of Curvature | Axial Thickness/ Separation | Refractive Index Nd | Constringence Vd |
|---|---|---|---|---|---|
| 1 | R1 | +186.991 | 6.310 | 1.55671 | 58.65 |
|  | R2 | +699.288 | 0.311 |  |  |
| 3 | R3 | +125.840 | 16.440 | 1.55671 | 58.65 |
| 4 | R4 | −179.823 | 3.553 | 1.69895 | 30.07 |
|  | R5 | +459.873 | 0.311 |  |  |
| 6 | R6 | +97.201 | 14.043 | 1.55671 | 58.65 |
| 7 | R7 | −299.751 | 3.553 | 1.52944 | 51.68 |
|  | R8 | +106.519 | 89.450 |  |  |
| 8 | R9 | +31.683 | 6.155 | 1.55671 | 58.65 |
|  | R10 | −69.602 | 2.211 | 1.69895 | 30.07 |
|  | R11 | −183.473 | 1.901 |  |  |
| 12 | R12 | PLANO | 1.863 | 1.54739 | 53.63 |
| 10 | R13 | PLANO | 18.999 | 1.69895 | 30.07 |
|  | R14 | PLANO | 1.261 |  |  |
| 9 | R15 | −83.072 | 1.894 | 1.69895 | 30.07 |
|  | R16 | +47.768 | 4.088 |  |  |

EFL = 100
F. No. F/1.15
Field of View 9 degrees
Diameter of Surface R1 = 87.0
Aperture Stop: 0.760 after R11
$\Delta$Pcs value of short flint glass element 7 = $+0.0133$

| Element | Surface | Radius of Curvature | Axial Thickness/ Separation | Refractive Index Nd | Constringence Vd |
|---|---|---|---|---|---|
| 1 | R1 | +188.940 | 6.310 | 1.55232 | 63.46 |
|   | R2 | +719.231 | 0.311 |   |   |
| 3 | R3 | +127.061 | 16.438 | 1.55232 | 63.46 |
| 4 | R4 | −180.841 | 3.552 | 1.64793 | 33.80 |
|   | R5 | +366.169 | 0.311 |   |   |
| 6 | R6 | +94.114 | 14.041 | 1.53996 | 59.71 |
|   | R7 | −202.526 |   |   |   |
| 7 |   |   | 3.552 | 1.55115 | 49.68 |
|   | R8 | +112.544 | 89.439 |   |   |
|   | R9 | +31.501 | 6.154 | 1.55671 | 58.65 |
| 8 | R10 | −81.708 | 2.211 | 1.69895 | 30.07 |
|   | R11 | −193.701 | 1.900 |   |   |
|   | R12 | PLANO | 1.863 | 1.54739 | 53.63 |
| 12 | R13 | PLANO |   |   |   |
| 10 |   |   | 19.457 | 1.69895 | 30.07 |
|   | R14 | PLANO | 1.261 |   |   |
|   | R15 | −66.749 | 1.894 | 1.69895 | 30.07 |
| 9 | R16 | +56.803 | 4.816 |   |   |

EFL = 100
F. No. F/1.15
Field of View 9 degrees
Diameter of Surface R1 = 87.0
Aperature Stop: 0.76 after R11
ΔPcs value of short flint glass element 7 = +0.0064

| Element | Surface | Radius of Curvature | Axial Thickness/ Separation | Refractive Index Nd | Constringence Vd |
|---|---|---|---|---|---|
| 1 | R1 | +188.652 | 6.310 | 1.56384 | 60.80 |
|   | R2 | +645.671 | 0.311 |   |   |
| 3 | R3 | +127.144 | 16.441 | 1.56384 | 60.80 |
| 4 | R4 | −184.426 | 3.553 | 1.67270 | 32.21 |
|   | R5 | +390.435 | 0.311 |   |   |
| 6 | R6 | +94.296 | 14.043 | 1.53996 | 59.71 |
|   | R7 | −269.735 |   |   |   |
| 7 |   |   | 3.553 | 1.55115 | 49.68 |
|   | R8 | +110.783 | 89.452 |   |   |
|   | R9 | +31.680 | 6.155 | 1.56384 | 60.80 |
| 8 | R10 | −81.804 | 2.211 | 1.69895 | 30.07 |
|   | R11 | −198.950 | 1.901 |   |   |
|   | R12 | PLANO | 1.863 | 1.54739 | 53.63 |
| 12 | R13 | PLANO |   |   |   |
| 10 |   |   | 19.404 | 1.69895 | 30.07 |
|   | R14 | PLANO | 1.261 |   |   |
|   | R15 | −63.735 | 1.894 | 1.69895 | 30.07 |
| 9 | R16 | +58.073 | 4.963 |   |   |

EFL = 100
F. No. F/1.15
Field of View 9 degrees
Diameter of Surface R1 = 87.0
Paraxial entrance pupil: 492.0 after R1
ΔPcs value of short flint glass element 7 = +0.0064

| Element | Surface | Radius of Curvature | Axial Thickness/ Separation | Refractive Index Nd | Constringence Vd |
|---|---|---|---|---|---|
| 1 | R1 | +270.128 | 10.160 | 1.55671 | 58.65 |
|   | R2 | +1156.032 | 0.500 |   |   |
| 3 | R3 | +203.342 | 26.470 | 1.53996 | 59.71 |
| 4 | R4 | −325.218 | 5.720 | 1.75693 | 31.80 |
|   | R5 | +574.501 | 0.500 |   |   |
| 6 | R6 | +165.323 | 22.610 | 1.60738 | 56.65 |
|   | R7 | −419.183 |   |   |   |
| 7 | R8 | +172.214 | 5.720 | 1.52944 | 51.68 |
|   | R9 | +52.819 | 144.020 |   |   |
| 8 | R10 | −140.339 | 9.910 | 1.55671 | 58.65 |
|   | R11 | −388.953 | 3.560 | 1.69895 | 30.07 |
|   | R12 | PLANO | 3.060 |   |   |
| 12 | R13 | PLANO | 3.000 | 1.54739 | 53.63 |
| 10 | R14 | PLANO | 40.123 | 1.69895 | 30.07 |
|   | R15 | −143.199 | 2.030 |   |   |
| 9 | R16 | +92.773 | 3.050 | 1.69895 | 30.07 |
|   |   |   | 5.452 |   |   |

EFL = 161.0
F. No. F/1.15
Field of View 9 degrees
Diameter of Surface R1 = 140.0
Aperature Stop: 1.22 after R11
ΔPcs value of short flint glass element 7 = +0.0133

| Element | Surface | Radius of Curvature | Axial Thickness/ Separation | Refractive Index Nd | Constringence Vd |
|---|---|---|---|---|---|
| 1 | R1 | +272.825 | 10.160 | 1.55671 | 58.65 |
|   | R2 | +1455.915 | 0.500 |   |   |
| 3 | R3 | +204.745 | 26.470 | 1.53375 | 55.31 |
| 4 | R4 | −333.775 | 5.720 | 1.69895 | 30.07 |
|   | R5 | +460.306 | 0.500 |   |   |
| 6 | R6 | +160.213 | 22.610 | 1.59181 | 58.30 |
|   | R7 | −759.080 |   |   |   |
| 7 | R8 | +172.784 | 5.720 | 1.52944 | 51.68 |
|   | R9 | +52.744 | 144.020 |   |   |
| 8 | R10 | −168.109 | 9.910 | 1.55671 | 58.65 |
|   |   |   | 3.560 | 1.69895 | 30.07 |

-continued

| Element | Surface | Radius of Curvature | Axial Thickness/ Separation | Refractive Index Nd | Constringence Vd |
|---|---|---|---|---|---|
| | R11 | −474.360 | | | |
| | | | 3.060 | | |
| 12 | R12 | PLANO | | | |
| | | | 3.000 | 1.54739 | 53.63 |
| | R13 | PLANO | | | |
| 10 | | | 39.916 | 1.69895 | 30.07 |
| | R14 | PLANO | | | |
| | | | 2.030 | | |
| | R15 | −117.528 | | | |
| 9 | | | 3.050 | 1.80518 | 25.43 |
| | R16 | +117.528 | | | |
| | | | 5.987 | | |

EFL = 161.0
F. No. F/1.15
Field of view 9 degrees
Diameter of Surface R1 = 140.0
Aperature Stop: 1.22 after R11
ΔPcs value of short flint glass element 7 = +0.0133

| Element | Surface | Radius of Curvature | Axial Thickness/ Separation | Refractive Index Nd | Constringence Vd |
|---|---|---|---|---|---|
| | R1 | +253.352 | | | |
| 1 | | | 10.160 | 1.55671 | 58.65 |
| | R2 | +1086.865 | | | |
| | | | 0.500 | | |
| | R3 | +201.378 | | | |
| 3 | | | 26.470 | 1.53996 | 59.71 |
| | R4 | −746.813 | | | |
| 4 | | | 5.720 | 1.74950 | 34.95 |
| | R5 | +489.155 | | | |
| | | | 0.500 | | |
| | R6 | +167.019 | | | |
| 6 | | | 22.610 | 1.60738 | 56.65 |
| | R7 | −601.153 | | | |
| 7 | | | 5.720 | 1.62096 | 36.18 |
| | R8 | +200.507 | | | |
| | | | 144.020 | | |
| | R9 | +53.592 | | | |
| | | | 9.910 | 1.55671 | 58.65 |
| 8 | R10 | +137.789 | | | |
| | | | 3.560 | 1.75693 | 31.80 |
| | R11 | −410.218 | | | |
| | | | 3.060 | | |
| 12 | R12 | PLANO | | | |
| | | | 3.000 | 1.54739 | 53.63 |
| | R13 | PLANO | | | |
| 10 | | | 39.507 | 1.69895 | 30.07 |
| | R14 | PLANO | | | |
| | | | 2.030 | | |
| | R15 | +3034.027 | | | |
| 9 | | | 3.050 | 1.80518 | 25.43 |
| | R16 | +56.165 | | | |
| | | | 3.963 | | |

EFL = 161.0
F. No. F/1.15
Field of View 9 degrees
Diameter of Surface R1 = 140.0
Aperature Stop: 1.22 after R11
ΔPcs value of short flint glass element 7 = +0.0038

| Element | Surface | Radius of Curvature | Axial Thickness/ Separation | Refractive Index Nd | Constringence Vd |
|---|---|---|---|---|---|
| | R1 | +272.963 | | | |
| 1 | | | 10.160 | 1.55671 | 58.65 |
| | R2 | +1030.086 | | | |
| | | | 0.500 | | |
| | R3 | +210.803 | | | |
| 3 | | | 26.470 | 1.55671 | 58.65 |
| | R4 | −327.874 | | | |
| 4 | | | 5.720 | 1.75693 | 31.80 |
| | R5 | +586.144 | | | |

-continued

| Element | Surface | Radius of Curvature | Axial Thickness/ Separation | Refractive Index Nd | Constringence Vd |
|---|---|---|---|---|---|
| | | | 0.500 | | |
| | R6 | +159.834 | | | |
| 6 | | | 22.610 | 1.59181 | 58.30 |
| | R7 | −432.323 | | | |
| 7 | | | 5.720 | 1.52944 | 51.68 |
| | R8 | +174.625 | | | |
| | | | 144.020 | | |
| | R9 | +53.009 | | | |
| | | | 9.910 | 1.55671 | 58.65 |
| 8 | R10 | −145.273 | | | |
| | | | 3.560 | 1.75693 | 31.80 |
| | R11 | −412.784 | | | |
| | | | 3.060 | | |
| 12 | R12 | PLANO | | | |
| | | | 3.000 | 1.54739 | 53.63 |
| | R13 | PLANO | | | |
| 10 | | | 40.216 | 1.69895 | 30.07 |
| | R14 | PLANO | | | |
| | | | 2.030 | | |
| | R15 | −148.230 | | | |
| 9 | | | 3.050 | 1.80518 | 25.43 |
| | R16 | +96.946 | | | |

EFL = 161.0
F. No. F/1.15
Field of View 9 degrees
Diameter of Surface R1 = 140.0
Aperature Stop: 1.22 after R11
ΔPcs value of short flint glass element 7 = +0.0133

The above examples include a beam-combining prism 10 (defined by surfaces R13 and R14) and a "minus-blue" filter 12 (defined by surfaces R12 and R13) cemented thereto. It will be appreciated that the aberration balance of the lens could be re-achieved by optimisation if the prism were to be removed.

It will be appreciated that the aperture of a lens in accordance with the FIG. 1 embodiment can be increased in a manner well known per se by splitting positive power off the crown lens elements in the doublet components and repositioning the positive power as one or more singlet elements at some other position(s) in the front lens group. For example, the front lens group I shown in FIG. 1 may be modified to include a further positive singlet element 13 in front of the singlet element 1 as shown in FIG. 2, or to include a further positive singlet element 14 behind the second doublet component 5 as shown in FIG. 3. It will be understood that the more singlet elements the higher will be the achieved aperture but the increased levels of spherochromatism will eventually limit the aperture increase.

The central air-gap in the lens, i.e. the space between the front and rear lens groups (specifically between the surfaces R8 and R9), is sufficiently long (for example approximately 0.9 F) to accommodate a light bending or folding mirror 15 as shown in FIG. 4. The angle of this plane mirror may be adjustable and the mirror is preferably mounted for angular movement about an axis O lying in the plane of the mirror and orthogonal to the plane of FIG. 4. The front lens group I is also mounted for angular movement about the axis O and a drive coupling of known form (not shown) is provided between the mirror 15 and the front lens group I such that the mirror 15 rotates in the same direction as but at half the angular speed of the lens group I. The rear lens group II is mounted to be held stationary relative to a fixed image position P (which may be occupied by a photocathode). With this arrangement the line of sight of the overall lens is variable, e.g. in elevation, by angular movement of the front lens group I and the mirror 15, a further position of these parts being shown in broken line in FIG. 4.

I claim:

1. A modified Petzval lens system comprising a front lens group and a rear lens group spaced from the front lens group, wherein the front lens group comprises at least two doublet components one of which consists of a crown positive element cemented to a flint negative element with the flint glass having significantly higher refractive index and dispersion values than those of the crown glass, the other said doublet component consisting of a crown positive element and a flint negative element with the flint and crown glasses having similar refractive indices but dissimilar dispersions, the flint glass having a positive red relative partial dispersion deviant.

2. A lens system according to claim 1 in which in said one doublet component the flint glass has a refractive index value $n_F$ and a constringence, or V value, $V_F$ and the crown glass has a refractive index value $n_c$ and a constringence, or V value $V_c$, which accord with the relationships:

$n_F - n_c > +0.09$
$V_c - V_F$ between 20 and 30

3. A lens system according to claim 1 or claim 2 in which in said other doublet component the flint glass has a refractive index value $n_F$ and a constringence, or V value, $V_F$ and the crown glass has a refractive index value $n_c$ and a constringence, or V value, $V_c$ which accord with the relationships:

$n_c - n_F$ between $+0.08$ and $-0.02$ $V_c - V_F > 4.5$

4. A lens system according to claim 1 wherein the crown and flint elements of said other doublet component are cemented together.

5. A lens system according to claim 2 wherein the crown and flint elements of said other doublet component are cemented together.

6. A lens system according to claim 1 wherein the front lens group comprises, in addition to said at least two doublet components, one or more singlet elements.

7. A lens system according to claim 2 wherein the front lens group comprises, in addition to said at least two doublet components, one or more singlet elements.

8. A lens system according to claim 1 wherein the rear lens group consists of a positive cemented doublet component and a negative field flattening element placed close to the image plane.

9. A lens system according to claim 2 wherein the rear lens group consists of a positive cemented doublet component and a negative field flattening element placed close to the image plane.

10. A lens system according to claim 1 having a gap in one rear lens group and a beam-combining prism located in that gap.

11. A lens system according to claim 2 having a gap in the rear lens group and a beam-combining prism located in that gap.

12. A lens system according to claim 1 comprising means to fold or bend the light path through the lens located in the space between the front lens group and the rear lens group.

13. A lens system according to claim 2 comprising means to fold or bend the light path through the lens located in the space between the front lens group and the rear lens group.

14. A lens system according to claim 12 wherein said means comprises an angularly adjustable plane mirror.

15. A lens system according to claim 12 wherein said means comprises an angularly adjustable plane mirror and wherein the front lens group and the mirror are mounted for angular movement about an axis in the plane of the mirror and means are provided to move the mirror angularly at half the speed of the angular movement of the front lens group.

16. In a modified Petzval lens system having a front group of lens elements comprising a doublet component consisting of a crown positive element cemented to a flint negative element, the flint glass having significantly higher refractive index and dispersion values than the crown glass, the lens further having a rear group of lens elements, the improvement comprising an additional doublet component in the front group of lens elements, said additional doublet component being positioned adjacent the first said doublet component and consisting of a crown positive element and a flint negative element, the flint and crown glasses having similar refractive indices but dissimilar dispersions and the flint glass having a positive red relative partial dispersion deviant.

* * * * *